A. KRIEGER.
DETACHABLE SAW TOOTH.
APPLICATION FILED JUNE 12, 1912.
1,048,182.
Patented Dec. 24, 1912.
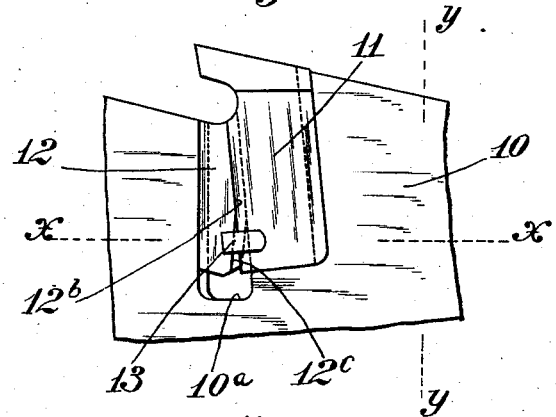
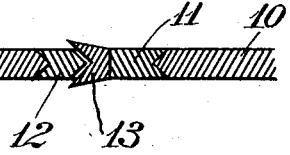
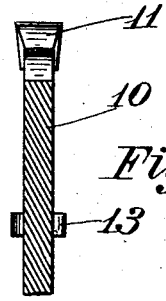
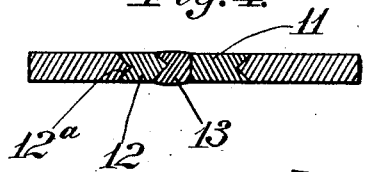
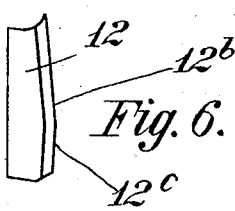
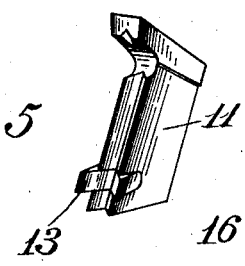
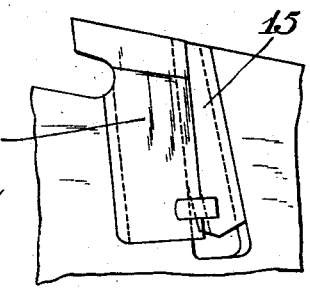
Witnesses
Benjamin Finckel
Donald W. Kling.
Inventor
Andrew Krieger
by Finckel & Finckel
his Attorneys

UNITED STATES PATENT OFFICE.

ANDREW KRIEGER, OF COLUMBUS, OHIO.

DETACHABLE SAW-TOOTH.

1,048,182.

Specification of Letters Patent.　Patented Dec. 24, 1912.

Application filed June 12, 1912. Serial No. 703,116.

*To all whom it may concern:*

Be it known that I, ANDREW KRIEGER, a citizen of the United States, residing at Columbus, in the county of Franklin and State of Ohio, have invented a certain new and useful Improvement in Detachable Saw-Teeth, of which the following is a specification.

The primary object of this invention is to provide improved means for securing detachable saw teeth to the body of the saw so that notwithstanding they are firmly held for performing their proper work they can be easily removed when desired.

The invention is embodied in the construction herein shown and described.

In the accompanying drawings forming part hereof—Figure 1 shows in side elevation one of the saw teeth and the improved means for securing it in a piece of the saw body. Fig. 2 is a section on the line $y$—$y$ Fig. 1. Fig. 3 is a section on the line $x$—$x$ Fig. 1 showing the locking device open. Fig. 4 is a similar section showing the locking device in closed or locking position. Fig. 5 is a perspective view of the tooth which contains the locking device. Fig. 6 is a side view of the wedge. Fig. 7 is a view like Fig. 1 showing a modification.

In the views (Figs. 1 to 6) 10 designates the saw body which has a tooth and wedge receiving recess having sides inclined toward each other as they approach the edge of the saw body. The recess has an inward extension at $10^a$ as shown.

11 designates the tooth, the shank of which has grooved parallel edges and 12 the wedge which is shown as located at the front of the tooth. The wedge has one grooved straight edge $12^a$ to fit on the tongue of one side of the recess while the other edge is tongued and doubly inclined as seen at $12^b$ and $12^c$ so that the wedge tapers toward each end. The wedge is made of such dimensions that one of its tapered ends closes a portion of the space between the shank of the tooth and edge forming one side of the recess in the saw body while the other end leaves an angular space between it and the lower end of the shank and the wedge. Formed permanently with the shank of the saw tooth is a V-shaped tongue or lock 13 that is of softer metal than the tooth and can be pressed into the angular space between the wedge and shank after the wedge has been forced outward into position to firmly hold the tooth in position. When the soft metal lock has been pressed into place as shown in Fig. 4 neither the tooth nor the wedge can be moved in any direction with reference to each other or to the saw body except by forcibly dislodging the wedge which is best accomplished by driving it inward with a blow or blows on its outer end. When the wedge is driven inward the tongue thereof merely spreads the parts of the soft metal lock without destroying it and ordinarily leaving it in condition for further use in the same way.

In inserting a tooth the wedge is first placed in the recess with its straight edge against the side of the recess and its inner end extended into the recess extension $10^a$. This leaves room for the insertion of the shank of the tooth. After this the wedge is forced outward until the tooth is tightly in position.

In Fig. 7 the wedge 15 is shown at the back of the tooth 16, the construction and operation being substantially the same as first described.

What I claim is:

1. The combination with a recessed saw body, of a detachable tooth to fit in one side of said recess, a doubly tapered wedge, one tapered part of which fits between said tooth and the other side of said recess and a lock for engaging both the tooth and the other tapered part of said wedge.

2. The combination with a recessed saw body, of a detachable tooth to fit at one edge in one side of said recess, said tooth having its other edge grooved, a doubly longitudinally tapered wedge having a tongued edge and adapted to be inserted between said tooth and the other side of said recess, the tongued part of one tapered portion of said wedge entering the said grooved edge of the tooth, the other tapered part of said wedge lying at an angle to the said tongued edge of the tooth, and a lock connected with said tooth and adapted to be engaged with the last named tapered portion of said wedge.

ANDREW KRIEGER.

Witnesses:
 BENJAMIN FINCKEL,
 OTTO KUECHLER.